(12) United States Patent
Sung et al.

(10) Patent No.: US 9,740,273 B2
(45) Date of Patent: *Aug. 22, 2017

(54) FILE SHARING CIRCUIT AND COMPUTER USING THE SAME

(71) Applicant: Wistron Corporation, New Taipei (TW)

(72) Inventors: Yung-Chi Sung, New Taipei (TW); En-Shan Tsuei, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 391 days.

This patent is subject to a terminal disclaimer.

(21) Appl. No.: 14/071,736

(22) Filed: Nov. 5, 2013

(65) Prior Publication Data

US 2014/0344607 A1    Nov. 20, 2014

(30) Foreign Application Priority Data

May 17, 2013 (TW) .............................. 102117638 A

(51) Int. Cl.
*G06F 1/00* (2006.01)
*G06F 1/32* (2006.01)

(52) U.S. Cl.
CPC .......... *G06F 1/3287* (2013.01); *G06F 1/3203* (2013.01); *Y02B 60/1278* (2013.01); *Y02B 60/1282* (2013.01)

(58) Field of Classification Search
CPC .. G06F 1/3203; G06F 1/3287; Y02B 60/1278
See application file for complete search history.

(56) References Cited

U.S. PATENT DOCUMENTS 8,619,887 B2    12/2013  Rezvani et al.
2005/0097279 A1*  5/2005  Nakanishi ............. G06F 3/0619
                                                    711/147

(Continued)

FOREIGN PATENT DOCUMENTS

CN    101424971 A    5/2009
CN    102483647 A    5/2012

(Continued)

OTHER PUBLICATIONS

Partial English translation of TW Office Action dated Feb. 26, 2015 in corresponding Taiwan application (No. 102117638).

(Continued)

*Primary Examiner* — Mohammed Rehman
*Assistant Examiner* — Gayathri Sampath
(74) *Attorney, Agent, or Firm* — McClure, Qualey & Rodack, LLP

(57) ABSTRACT

File sharing circuit and computer using the same are provided. The computer includes a computer host and a file sharing circuit. The computer host includes a first storage device, a first system control chip, a control unit, and a power integrated circuit. The file sharing circuit includes a second system control chip and a first bus switch. When the second system control chip performs a file sharing procedure, the power integrated circuit powers the first storage device, the second system control chip, and the first bus switch, and the control unit switches the first bus switch to a first state so that the second system control chip accesses the first storage device. When the second system control chip does not perform the file sharing procedure, the control unit switches the first bus switch to a second state so that the first system control chip accesses the first storage device.

24 Claims, 5 Drawing Sheets

(56) References Cited

U.S. PATENT DOCUMENTS

| | | | | |
|---|---|---|---|---|
| 2006/0069930 A1* | 3/2006 | Dixon | ............... | G06F 13/4226 |
| | | | | 713/300 |
| 2009/0112884 A1* | 4/2009 | Sathath | ............... | G06F 3/0625 |
| 2010/0057975 A1* | 3/2010 | Ejiri | ................ | G06F 3/0605 |
| | | | | 710/316 |
| 2010/0088456 A1* | 4/2010 | Chu | ................ | H04L 67/1097 |
| | | | | 710/316 |
| 2011/0055434 A1* | 3/2011 | Pyers | ................ | G06F 1/3203 |
| | | | | 710/14 |
| 2012/0297331 A1 | 11/2012 | Chutkay et al. | | |
| 2013/0013687 A1 | 1/2013 | Liu | | |

FOREIGN PATENT DOCUMENTS

| | | |
|---|---|---|
| TW | 201029360 A | 8/2010 |
| TW | M416197 U1 | 11/2011 |
| TW | 201303724 A | 1/2013 |

OTHER PUBLICATIONS

SIPO Office Action dated Aug. 26, 2016 in Chinese application (No. 201310211345.7).

English translation of SIPO Office Action dated Aug. 26, 2016 in Chinese application (No. 201310211345.7).

* cited by examiner

FILE SHARING CIRCUIT AND COMPUTER USING THE SAME

This application claims the benefit of Taiwan application Serial No. 102117638, filed May 17, 2013, the subject matter of which is incorporated herein by reference.

BACKGROUND OF THE INVENTION

Field of the Invention

The invention relates in general to an electronic device, and more particularly to a file sharing circuit and computer using the same.

Description of the Related Art

As the science and technology progress, the types of electronic devices increase and the consumers may own several types of the electronic devices, such as mobile phones, tablet computers, notebook computers, or personal computers, and so on. These electronic devices may store repeated data, or same types of data are stored in different electronic devices. This makes data management difficult or the problem of ineffective use of the storage space.

For resolving this problem, network attached storage (NAS) devices are provided. An NAS device is an electronic device independent of the computers as well as a storage device for file access by the computers through network connection. Specifically, the NAS device may connect to one or more high capacity storage drives and enable the user to access the data of the storage drive through network connection.

However, such external NAS device has to be disposed on a desk or the ground, and thus occupies external space. In addition, the NAS device is required to be powered by external power source, which also occupies one of the limited indoor sockets. It is inconvenient to use in that way. Thus, it becomes an important topic of how to make the user conveniently sharing files for the electronic devices.

SUMMARY OF THE INVENTION

The invention is directed to a file sharing circuit and computer using the same.

According to an aspect of the invention, a computer is provided. The computer includes a computer host and a file sharing circuit. The computer host includes a first storage device, a first system control chip, a control unit, and a power integrated circuit. The file sharing circuit includes a second system control chip and a first bus switch. When the second system control chip performs a file sharing procedure, the power integrated circuit powers the first storage device, the second system control chip, and the first bus switch. The control unit controls the first bus switch to switch to a first state so that the second system control chip accesses the first storage device, When the second system control chip does not perform the file sharing procedure, the control unit controls the first bus switch to switch to a second state so that the first system control chip accesses the first storage device.

According to another aspect of the invention, a file sharing circuit is provided. The file sharing circuit is suitable for use in a computer host including a first storage device, a first system control chip, a control unit, and a power integrated circuit. The file sharing circuit includes a second system control chip, and a first bus switch. When the second system control chip performs a file sharing procedure, the power integrated circuit powers the first storage device, the second system control chip, and the first bus switch. The control unit controls the first bus switch to switch to a first state so that the second system control chip accesses the first storage device. When the second system control chip does not perform the file sharing procedure, the control unit controls the first bus switch to switch to a second state so that the first system control chip accesses the first storage device.

The above and other aspects of the invention will become better understood with regard to the following detailed description of the preferred but non-limiting embodiment(s). The following description is made with reference to the accompanying drawings.

DETAILED DESCRIPTION

First Embodiment

Figure 1:
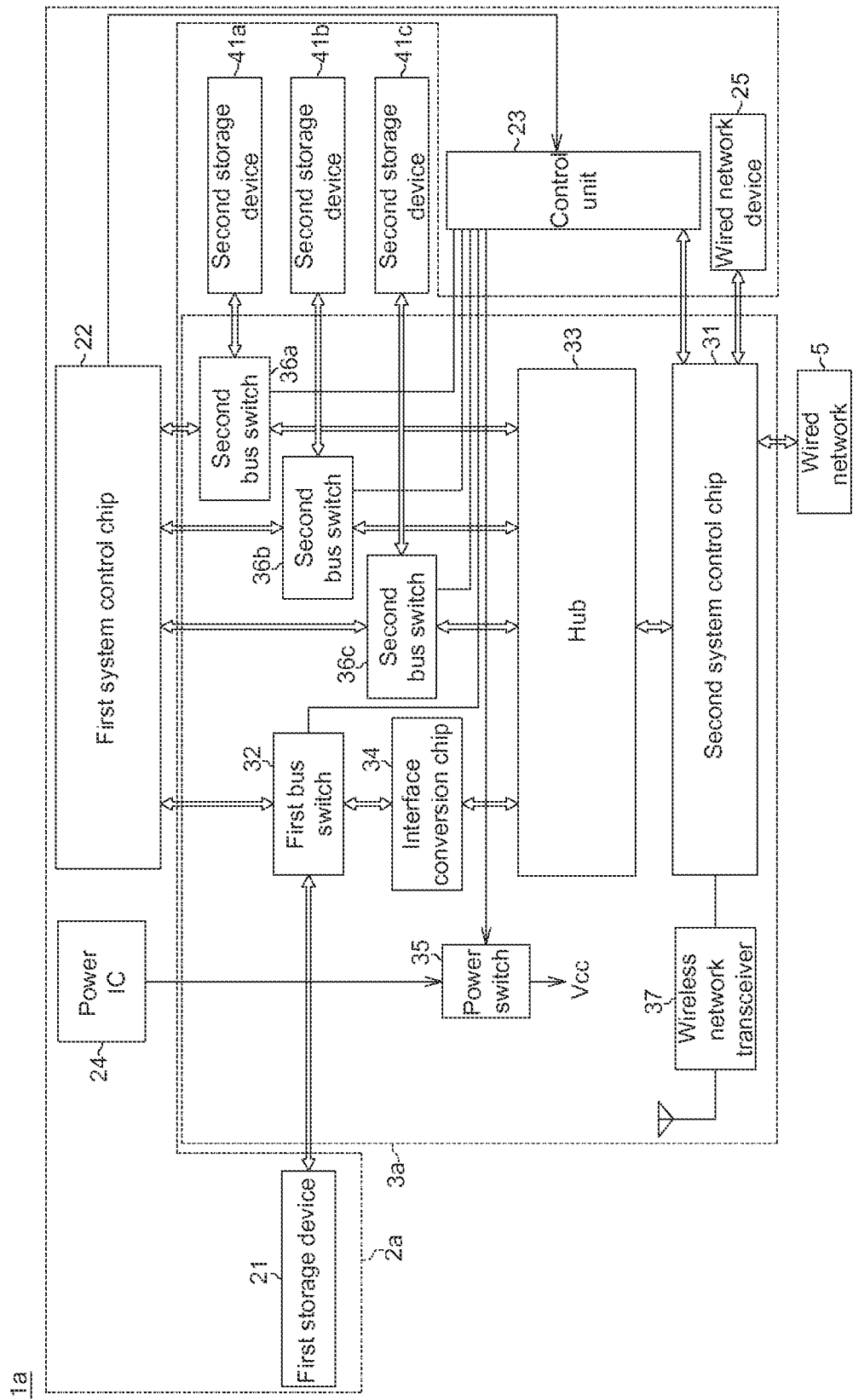
FIG. 1 is a block diagram illustrating a computer according to a first embodiment.

Referring to FIG. 1, a block diagram illustrates a computer according to a first embodiment. A computer 1a includes a computer host 2a and a file sharing circuit 3a. The computer host 2a includes a first storage device 21, a first system control chip 22, a control unit 23, a power integrated circuit (IC) 24, and a wired network device 25, where the first storage device 21, for example, is a serial advanced technology attachment (SATA) storage device built in the computer host 2a. The first system control chip 22, for example, is a chipset or south bridge chip, and the control unit 23, for example, is an embedded controller (EC). The power IC 24 supplies a working voltage Vcc through a power switch 35 to the first storage device 21, second storage devices 41a, 41b, 41c, a second system control chip 31, a first bus switch 32, second bus switches 36a, 36b, 36c, a hub 33, and an interface conversion chip 34.

The file sharing circuit 3a includes the second system control chip 31, the first bus switch 32, the hub 33, the interface conversion chip 34, the power switch 35, the second bus switches 36a, 36b, 36c, and a wireless network transceiver 37. The second system control chip 31, for example, is a network attached storage (NAS) control chip, and the wireless network transceiver 37, for example, is a wireless network communication (such as Wi-Fi) module built in, or externally connected to, the second system control chip 31. The second system control chip 31 is coupled to the wired network 5, the control unit 23, the wired network device 25, the hub 33, and the wireless network transceiver 37. The hub 33 is connected to the second system control chip 31, and the hub 33 is coupled to the first bus switch 32 through the interface conversion chip 34. The interface conversion chip 34, for example, converts SATA data of the first storage device 21 into USB data and outputs them to the hub 33. The first bus switch 32 is controlled by the control unit 23 so as to switch to a first state or a second state. When the control unit 23 controls the first bus switch 32 to switch to the first state, the first storage device 21 is coupled to the interface conversion chip 34 through the first bus switch 32. Conversely, when the control unit 23 controls the first bus switch 32 to switch to the second state, the first storage device 21 is coupled to the first system control chip 22 through the first bus switch 32.

The second bus switches 36a, 36b, 36c are controlled by the control unit 23 to switch to the first state or the second state. When the control unit 23 controls the second bus switches 36a, 36b, 36c to switch to the first state, the second storage device 41a is coupled to the hub 33 through the second bus switch 36a, the second storage device 41b is coupled to the hub 33 through the second bus switch 36b, the second storage device 41c is coupled to the hub 33 through the second bus switch 36c. The second storage devices 41a, 41b, and 41c are external universal serial bus (USB) storage devices, for example.

Conversely, when the control unit 23 controls the second bus switches 36a, 36b, 36c to switch to the second state, the second storage device 41a is coupled to the first system control chip 22 through the second bus switch 36a, the second storage device 41b is coupled to the first system control chip 22 through the second bus switch 36b, the second storage device 41c is coupled to the first system control chip 22 through the second bus switch 36c. The power switch 35 is controlled by the control unit 23 to determine whether to power the first storage device 21, the hub 33, the interface conversion chip 34, and the second system control chip 31.

Figure 2:
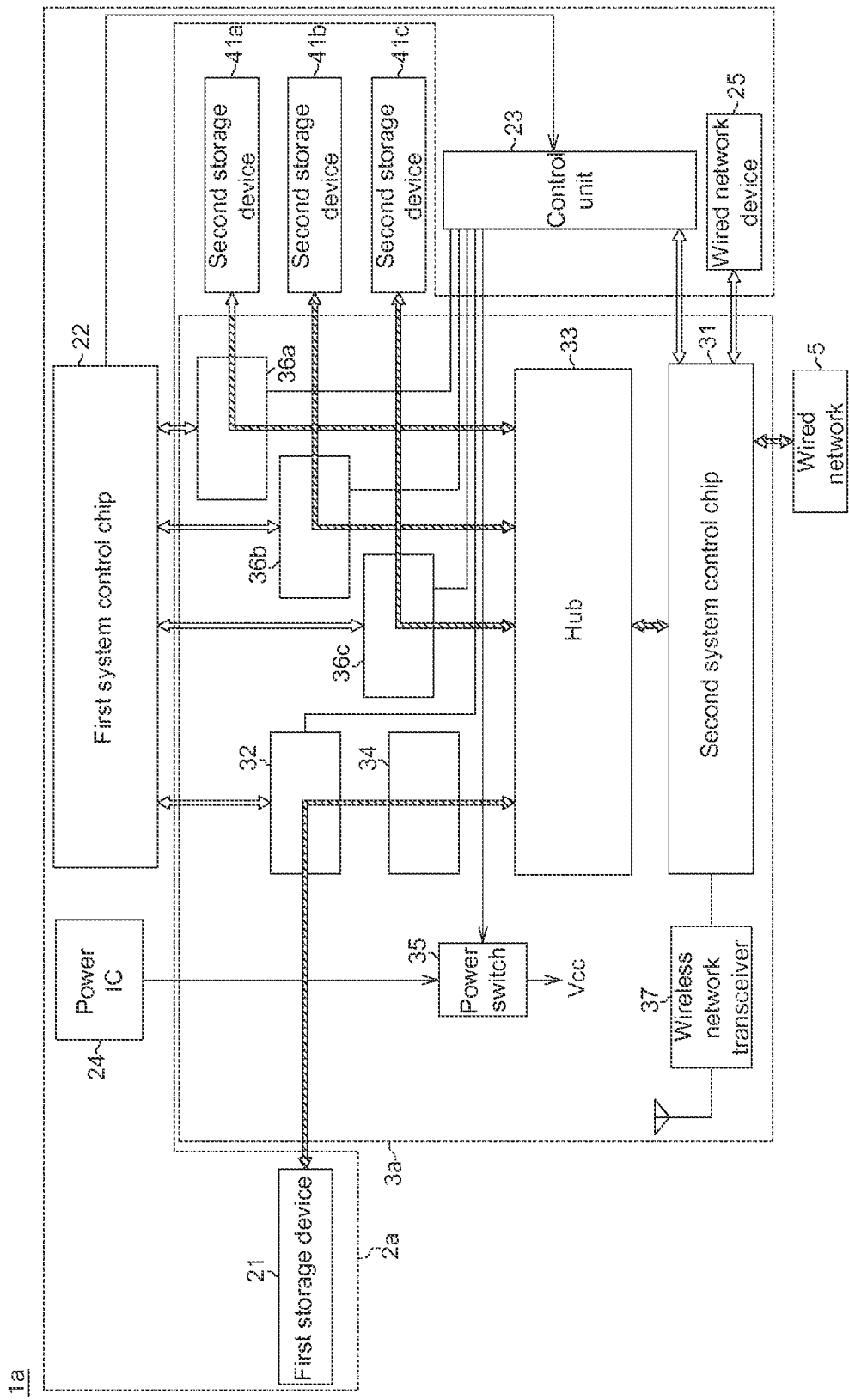
FIG. 2 is a schematic diagram illustrating a first bus switch and a second bus switch switching to a first state.
Figure 3:
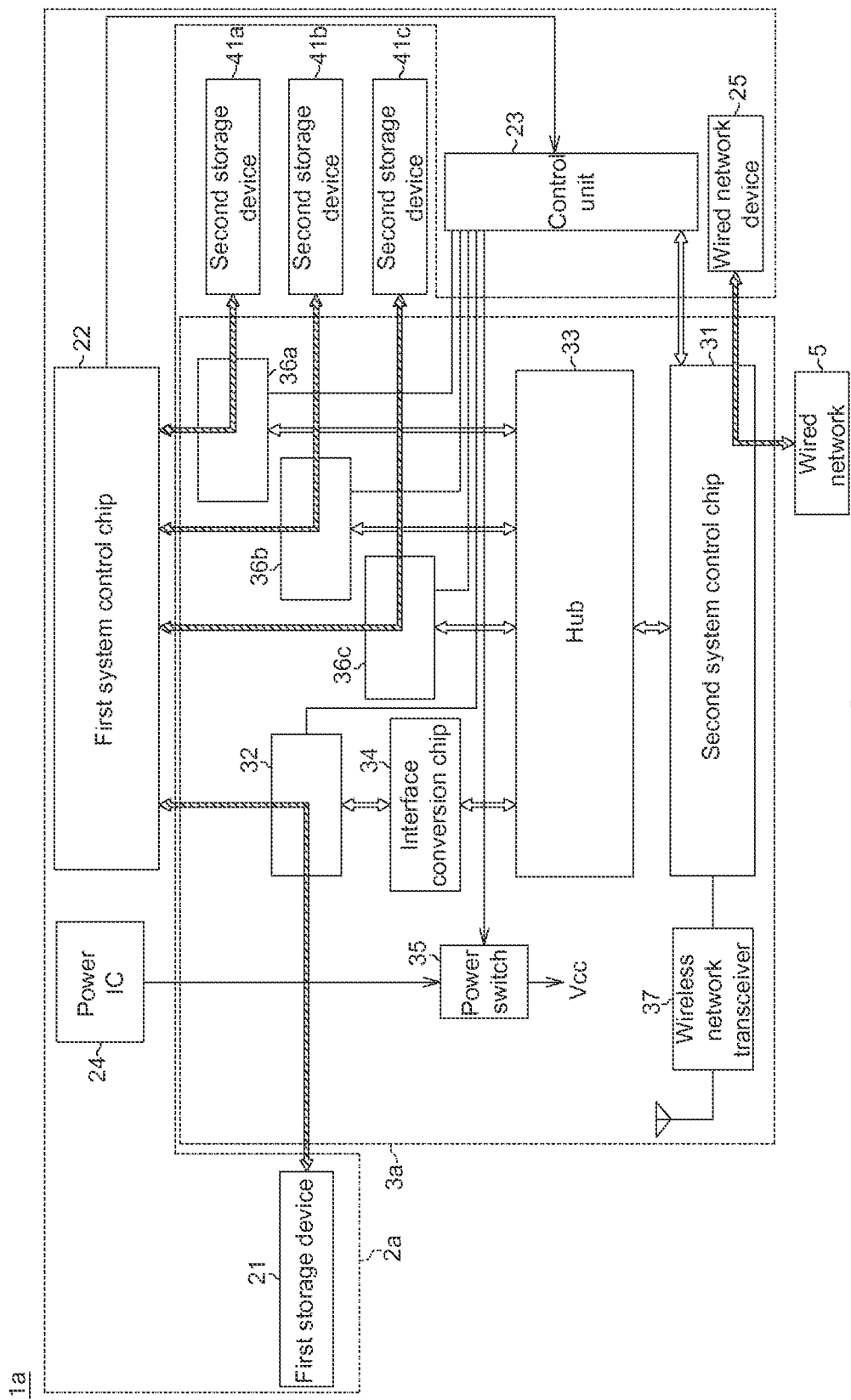
FIG. 3 is a schematic diagram illustrating a first bus switch and a second bus switch switching to a second state.

Referring to FIGS. 1, 2, and 3, FIG. 2 illustrates the first bus switch and the second bus switch switching to the first state in a schematic diagram, and FIG. 3 illustrates the first bus switch and the second bus switch switching to the second state in a schematic diagram. When the second system control chip 31 performs a file sharing procedure, the control unit 23 turns on the power switch 35. The second system control chip 31 performs the file sharing procedure, for example, after the computer host 2a enters a suspend-to-RAM (Random Access Memory) mode (S3), a hibernation mode (S4), or a shut down mode (S5). The suspend-to-RAM mode (S3), the hibernation mode (S4), and the shut down mode (S5) are three power states defined by Advanced Configuration and Power Interface (ACPI).

The power IC 24 supplies a working voltage Vcc through the power switch 35 to the first storage device 21, the second storage devices 41a, 41b, 41c, the second system control chip 31, the first bus switch 32, the second bus switches 36a, 36b, 36c, the hub 33, and the interface conversion chip 34. The control unit 23 controls the first bus switch 32 to switch to the first state so that the second system control chip 31 accesses the first storage device 21 by. The control unit 23 controls the second bus switches 36a, 36b, and 36c to switch to the first state so that the second system control chip 31 accesses the second storage devices 41a, 41b, and 41c (as shown in FIG. 2).

Conversely, when the second system control chip 31 does not perform the file sharing procedure, the control unit 23 controls the first bus switch 32 to switch to the second state so that the first system control chip 22 accesses the first storage device 21. The control unit 23 controls the second bus switches 36a, 36b, and 36c to switch to the second state so that the first system control chip 22 accesses the second storage devices 41a, 41b, and 41c (as shown in FIG. 3). When the computer host 2a enters the suspend-to-RAM mode (S3), the hibernation mode (S4), or the shut down mode (S5), the control unit 23 turns off the power switch 35 to stop supplying the working voltage Vcc to the first storage device 21, the second storage devices 41a, 41b, 41c, the second system control chip 31, the first bus switch 32, the second bus switches 36a, 36b, 36c, the hub 33, and the interface conversion chip 34. Since the computer 1a includes the file sharing circuit 3a, the user can employ the file sharing functionality without the need to purchase external NAS devices. In this way, the user can experience the enhanced convenience in usage.

As exemplified above, the second system control chip 31 performs the file sharing procedure after the computer host 2a enters the suspend-to-RAM mode (S3), the hibernation mode (S4), or the shut down mode (S5), but the implementation can be made without limited to thereto. In another embodiment, the second system control chip 31 may be made to perform the file sharing procedure after entering a working mode (S0) defined by ACPI.

Second Embodiment

Figure 4:
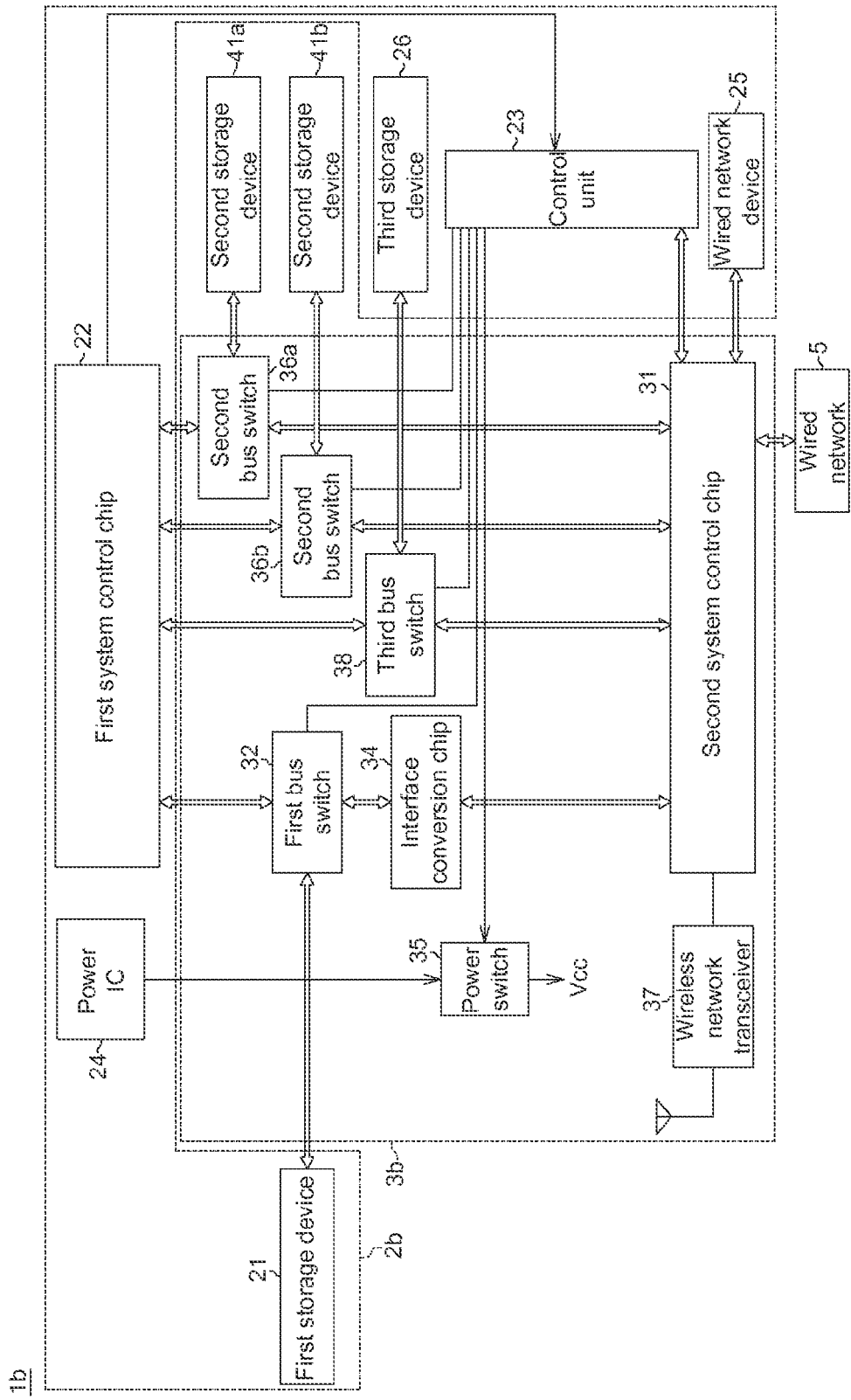
FIG. 4 is a block diagram illustrating a computer according to a second embodiment.

Referring to FIG. 4, FIG. 4 is a block diagram illustrating a computer 1b according to a second embodiment. The second embodiment differs from the first embodiment in that a computer host 2b of the computer 1b further includes a third storage device 26, and a file sharing circuit 3b further includes a third bus switch 38. The third bus switch 38, for example, is a SATA storage device built in the computer host 2b. The third bus switch 38 connects the third storage device 26 to the first system control chip 22 or the second system control chip 31.

When the second system control chip 31 performs a file sharing procedure, the control unit 23 turns on the power switch 35. The power IC 24 supplies a working voltage Vcc through the power switch 35 to the first storage device 21, the second storage devices 41a, 41b, the third storage device 26, the second system control chip 31, the first bus switch 32, the second bus switches 36a, 36b, the third bus switch 38, the hub 33, and the interlace conversion chip 34. The control unit 23 controls the first bus switch 32 to switch to the first state so that the second system control chip 31 accesses the first storage device 21. The control unit 23 controls the second bus switches 36a and 36b to switch to the first state so that the second system control chip 31 accesses the second storage devices 41a and 41b. The control unit 23 controls the third bus switch 38 to switch to the first state so that the second system control chip 31 accesses the third storage device 26.

Conversely, when the second system control chip 31 does not perform the file sharing procedure, the control unit 23 controls the first bus switch 32 to switch to a second state so that the first system control chip 22 accesses the first storage device 21. The control unit 23 controls the second bus switches 36a and 36b to switch to the second state so that the first system control chip 22 accesses the second storage devices 41a and 41b. The control unit 23 controls the third bus switch 38 to switch to the second state so that the first system control chip 22 accesses the third storage device 26. When the computer host 2b enters the suspend-to-RAM mode (S3), the hibernation mode (S4), or the shut down mode (S5), the control unit 23 turns off the power switch 35 to stop supplying the working voltage Vcc to the first storage device 21, the second storage devices 41a, 41b, 41c, the second system control chip 31, the first bus switch 32, the second bus switches 36a, 36b, the third bus switch 38, the hub 33, and the interface conversion chip 34.

As exemplified above, the second system control chip 31 performs the file sharing procedure after the computer host 2b enters the suspend-to-RAM mode (S3), the hibernation mode (S4), or the shut down mode (S5), but the implementation can be made without limited to thereto. In another embodiment, the second system control chip 31 may be made to perform the file sharing procedure after entering a working mode (S0) defined by ACPI.

Third Embodiment

Figure 5:
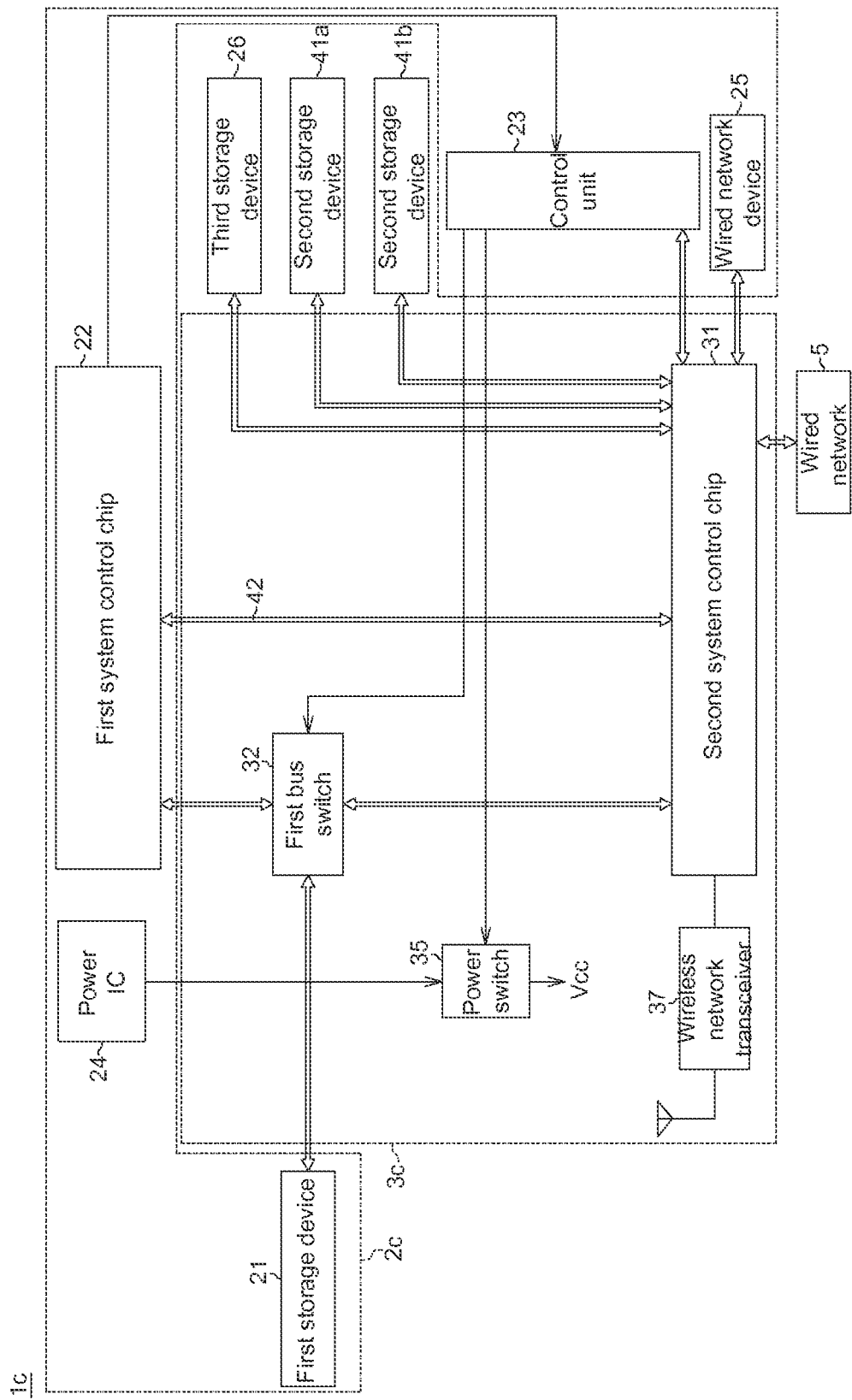
FIG. 5 is a block diagram illustrating a computer according to a third embodiment.

Referring to FIG. 5, FIG. 5 is a block diagram illustrating a computer 1c according to a third embodiment. The third embodiment differs from the first embodiment in that, in the computer 1c, the first bus switch 32 connects the first storage device 21 to the first system control chip 22 or the second system control chip 31, and the second system control chip 31 communicates with the first system control chip 22 through a fourth bus 42. The second system control chip 31 is externally connected to the second storage devices 41a, 41b, and the third storage device 26. The first system control chip 22 accesses the second storage devices 41a, 41b, or the third storage device 26 through the second system control chip 31. The third storage device 26 of the third embodiment, for example, is a SATA storage device built in the computer host 2c or an external SATA (e-SATA) hard disk drive externally connected to the computer host 2c. The first system control chip 22, through the fourth bus 42, accesses the second storage devices 41a and 41b from the second system control chip 31. For example, the fourth bus 42 is a high-speed PCIe interface; the first system control chip 22 is connected to the second system control chip 31 through the high-speed PCIe interface, and then accesses the second storage devices 41a and 41b through the second system control chip 31. Alternatively, the first system control chip 22 is connected to the second system control chip 31 through a network integrated circuit, and then accesses the second storage devices 41a and 41b through the second system control chip 31.

When the second system control chip 31 performs the file sharing procedure, the control unit 23 turns on the power switch 35. The power IC 24 supplies a working voltage Vcc through the power switch 35 to the first storage device 21, the second storage devices 41a, 41b, the third storage device 26, the second system control chip 31, and the first bus switch 32. The control unit 23 controls the first bus switch 32 to switch to the first state so that the second system control chip 31 accesses the first storage device 21.

Conversely, when the second system control chip 31 does not perform the file sharing procedure, the control unit 23 controls the first bus switch 32 to switch to the second state so that the first system control chip 22 accesses the first storage device 21. When the computer host 2c enters the suspend-to-RAM mode (S3), the hibernation mode (S4), or the shut down mode (S5), the control unit 23 turns off the power switch 35 to stop supplying the working voltage Vcc to the first storage device 21, the second storage devices 41a, 41b, the third storage device 26, the second system control chip 31, the first bus switch 32, and the interface conversion chip 34.

As exemplified above, the second system control chip 31 performs the file sharing procedure after the computer host 2c enters the suspend-to-RAM mode (S3), the hibernation mode (S4), or the shut down mode (S5), but the implementation can be made without limited to thereto. In another embodiment, the second system control chip 31 may be made to perform the file sharing procedure after entering the working mode (S0) defined by ACPI.

As described above, since the computer includes a file sharing circuit, the user can employ the file sharing functionality without the need to purchase external NAS devices. In this way, it also does not need to plug in or out the storage device, thus enhancing the convenience in usage for the user. Further, the computer of the above embodiments not only can perform the file sharing procedure in the suspend-to-RAM mode (S3), the hibernation mode (S4), or the shut down mode (S5) defined by ACPI, but also can perform the file sharing procedure in the working mode (S0) defined by ACPI.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer, comprising:
 a computer host, comprising:
  a first storage device;
  a first system control chip;
  a control unit; and
  a power integrated circuit; and
 a file sharing circuit, comprising:
  a second system control chip; and
  a first bus switch, wherein when the second system control chip performs a file sharing procedure, the power integrated circuit powers the first storage device, the second system control chip, and the first bus switch, and the control unit controls the first bus switch to switch to a first state so that the second system control chip accesses the first storage device; and when the second system control chip does not perform the file sharing procedure, the control unit controls the first bus switch to switch to a second state so that the first system control chip accesses the first storage device;
 wherein the computer host is externally connected to a second storage device, the file sharing circuit further comprises a second bus switch, wherein when the second system control chip performs the file sharing procedure, the control unit controls the second bus switch to switch to the first state so that the second system control chip accesses the second storage device; and when the second system control chip does not perform the file sharing procedure, the control unit controls the second bus switch to switch to the second state so that the first system control chip accesses the second storage device;
 wherein the file sharing circuit further comprises a hub connected to the second system control chip, an interface conversion chip, through which the hub is coupled to the first bus switch, and a power switch, wherein when the second system control chip performs the file sharing procedure, the control unit turns on the power switch to power the second system control chip, the hub, and the interface conversion chip, and the first storage device; and when the second system control chip does not perform the file sharing procedure, the control unit turns off the power switch to stop powering the second system control chip, the hub, and the interface conversion chip, and the first storage device.

2. The computer according to claim 1, wherein the file sharing circuit further comprises:
 a wireless network transceiver, coupled to the second system control chip.

3. The computer according to claim 1, wherein the second system control chip is coupled to the first bus switch through the interface conversion chip.

4. The computer according to claim 3, wherein the computer host further comprises a third storage device, the file sharing circuit further comprises a third bus switch for coupling the third storage device to the first system control chip or the second system control chip.

5. The computer according to claim 4, wherein the file sharing circuit further comprises: a power switch, wherein when the second system control chip performs the file sharing procedure, the control unit turns on the power switch to power the second system control chip, the interface conversion chip, the first storage device, and the third storage device; and when the second system control chip does not perform the file sharing procedure, the control unit turns off the power switch to stop powering the second system control chip, the interface conversion chip, the first storage device, and the third storage device.

6. The computer according to claim 2, wherein the first bus switch couples the first storage device to the first system control chip or the second system control chip.

7. The computer according to claim 6, wherein the second system control chip is externally connected to a second storage device, and the first system control chip accesses the second storage device through the second system control chip.

8. The computer according to claim 7, wherein the computer host further comprises a third storage device, the file sharing circuit further comprises an interface conversion chip, and the second system control chip is coupled to the third storage device through the interface conversion chip.

9. The computer according to claim 8, wherein the file sharing circuit further comprises: a power switch, wherein when the second system control chip performs the file sharing procedure, the control unit turns on the power switch to power the second system control chip, the interface conversion chip, the first storage device, and the third storage device; and when the second system control chip does not perform the file sharing procedure, the control unit turns off the power switch to stop powering the second system control chip, the interface conversion chip, the first storage device, and the third storage device.

10. The computer according to claim 7, wherein the computer chip is externally connected to a third storage device, and the first system control chip accesses the third storage device through the second system control chip.

11. The computer according to claim 10, wherein the file sharing circuit further comprises: a power switch, wherein when the second system control chip performs the file sharing procedure, the control unit turns on the power switch to power the second system control chip, the interface conversion chip, the first storage device, and the third storage device; and when the second system control chip does not perform the file sharing procedure, the control unit turns off the power switch to stop powering the second system control chip, the interface conversion chip, the first storage device, and the third storage device.

12. The computer according to claim 1, wherein the second system control chip performs the file sharing procedure after the computer host enters one of a suspend-to-RAM (Random Access Memory) mode (S3), a hibernation mode (S4), and a shut down mode (S5).

13. A file sharing circuit, for use in a computer host including a first storage device, a first system control chip, a control unit, and a power integrated circuit, the file sharing circuit comprising:
a second system control chip; and
a first bus switch, wherein when the second system control chip performs a file sharing procedure, the power integrated circuit powers the first storage device, the second system control chip, and the first bus switch, and the control unit controls the first bus switch to switch to a first state so that the second system control chip accesses the first storage device; and when the second system control chip does not perform the file sharing procedure, the control unit controls the first bus switch to switch to a second state so that the first system control chip accesses the first storage device;
wherein the computer host is externally connected to a second storage device, the file sharing circuit further comprises a second bus switch, wherein when the second system control chip performs the file sharing procedure, the control unit controls the second bus switch to switch to the first state so that the second system control chip accesses the second storage device; and when the second system control chip does not perform the file sharing procedure, the control unit controls the second bus switch to switch to the second state so that the first system control chip accesses the second storage device;
wherein the file sharing circuit further comprises a hub connected to the second system control chip, an interface conversion chip, through which the hub is coupled to the first bus switch, and a power switch, wherein when the second system control chip performs the file sharing procedure, the control unit turns on the power switch to power the second system control chip, the hub, and the interface conversion chip, and the first storage device; and when the second system control chip does not perform the file sharing procedure, the control unit turns off the power switch to stop powering the second system control chip, the hub, and the interface conversion chip, and the first storage device.

14. The file sharing circuit according to claim 13, further comprising:
a wireless network transceiver, coupled to the second system control chip.

15. The file sharing circuit according to claim 13, wherein the second system control chip is coupled to the first bus switch through the interface conversion chip.

16. The file sharing circuit according to claim 15, wherein the computer host further comprises a third storage device, the file sharing circuit further comprises a third bus switch for coupling the third storage device to the first system control chip or the second system control chip.

17. The file sharing circuit according to claim 16, further comprising a power switch, wherein when the second system control chip performs the file sharing procedure, the control unit turns on the power switch to power the second system control chip, the interface conversion chip, the first storage device, and the third storage device; and when the second system control chip does not perform the file sharing procedure, the control unit turns off the power switch to stop powering the second system control chip, the interface conversion chip, the first storage device, and the third storage device.

18. The file sharing circuit according to claim 14, wherein the first bus switch couples the first storage device to the first system control chip or the second system control chip.

19. The file sharing circuit according to claim 18, wherein the second system control chip is externally connected to a second storage device, and the first system control chip accesses the second storage device through the second system control chip.

20. The file sharing circuit according to claim 19, wherein the computer host further comprises a third storage device, the file sharing circuit further comprises an interface conversion chip, and the second system control chip is coupled to the third storage device through the interface conversion chip.

21. The file sharing circuit according to claim 20, further comprising a power switch, wherein when the second system control chip performs the file sharing procedure, the control unit turns on the power switch to power the second system control chip, the interface conversion chip, the first storage device, and the third storage device; and when the second system control chip does not perform the file sharing procedure, the control unit turns off the power switch to stop powering the second system control chip, the interface conversion chip, the first storage device, and the third storage device.

22. The file sharing circuit according to claim 19, wherein the computer chip is externally connected to a third storage device, and the first system control chip accesses the third storage device through the second system control chip.

23. The file sharing circuit according to claim 22, further comprising a power switch, wherein when the second system control chip performs the file sharing procedure, the control unit turns on the power switch to power the second system control chip, the interface conversion chip, the first storage device, and the third storage device; and when the second system control chip does not perform the file sharing procedure, the control unit turns off the power switch to stop powering the second system control chip, the interface conversion chip, the first storage device, and the third storage device.

24. The file sharing circuit according to claim 13, wherein the second system control chip performs the file sharing procedure after the computer host enters one of a suspend-to-RAM (Random Access Memory) mode (S3), a hibernation mode (S4), and a shut down mode (S5).

* * * * *